(12) United States Patent
Schulz

(10) Patent No.: US 11,916,757 B2
(45) Date of Patent: Feb. 27, 2024

(54) MANAGING THE OPERATION OF APPLICATIONS ON MOBILE COMPUTING DEVICES

(71) Applicant: ABB Schweiz AG, Baden (CH)

(72) Inventor: Dirk Schulz, Meckenheim (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/980,082

(22) Filed: Nov. 3, 2022

(65) Prior Publication Data

US 2023/0138964 A1 May 4, 2023

(30) Foreign Application Priority Data

Nov. 4, 2021 (EP) .................................... 21206347

(51) Int. Cl.
*H04L 29/06* (2006.01)
*H04L 41/5009* (2022.01)
*H04L 41/0816* (2022.01)

(52) U.S. Cl.
CPC ...... *H04L 41/5009* (2013.01); *H04L 41/0816* (2013.01)

(58) Field of Classification Search
CPC . H04L 41/5009; H04L 41/0816; H04L 29/06; H04L 63/20; H04L 63/0807; H04L 63/0272; H04L 63/029; G06F 25/173
USPC ........................................................ 709/221
See application file for complete search history.

(56) References Cited

U.S. PATENT DOCUMENTS

| 6,865,591 | B1* | 3/2005 | Garg ................... H04L 67/1031 709/201 |
| 8,918,775 | B1* | 12/2014 | Carpenter ........... G06F 9/44505 717/168 |
| 9,078,123 | B1 | 7/2015 | Benco et al. |
| 9,208,555 | B1 | 12/2015 | Steiger et al. |
| 10,007,555 | B1* | 6/2018 | Kuhne ..................... G06F 9/445 |
| 2002/0060805 | A1* | 5/2002 | Tomita .................. G06F 3/1208 358/1.15 |
| 2005/0034000 | A1* | 2/2005 | Lee .......................... G06F 1/28 713/320 |
| 2016/0162148 | A1* | 6/2016 | Murphy ................ G06F 3/0488 715/863 |
| 2019/0208263 | A1* | 7/2019 | Chamberlin ....... H04N 21/4622 |
| 2019/0319868 | A1 | 10/2019 | Svennebring et al. |

(Continued)

FOREIGN PATENT DOCUMENTS

EP 1227639 A2 7/2002

OTHER PUBLICATIONS

European Patent Office, Extended European Search Report in European Patent Application No. 21206347.3, 8 pp. (dated vMar. 29, 2022).

*Primary Examiner* — Jude Jean Gilles
(74) *Attorney, Agent, or Firm* — Leydig, Voit & Mayer, Ltd.

(57) ABSTRACT

A method for managing operation of a mobile application, the application being operable in different modes, comprises obtaining a current value of a performance indicator of a network to which a mobile computing device is attached; map, based on a rule set, the value of the performance indicator to an optimal operating mode of the application and/or to at least one action; and cause the application to switch to the optimal operating mode, initiate the action, or prompt a user to switch the application to the optimal operating mode or initiate the action.

17 Claims, 2 Drawing Sheets

(56) References Cited

U.S. PATENT DOCUMENTS

| | | | |
|---|---|---|---|
| 2020/0133374 A1* | 4/2020 | Sinha | G06F 1/3287 |
| 2021/0021702 A1* | 1/2021 | Gudivada | G06Q 30/0645 |
| 2021/0073169 A1* | 3/2021 | Wang | G06N 3/063 |
| 2021/0073170 A1* | 3/2021 | Liao | G06F 15/7807 |
| 2021/0351973 A1* | 11/2021 | Ford | H04L 41/0631 |

* cited by examiner

MANAGING THE OPERATION OF APPLICATIONS ON MOBILE COMPUTING DEVICES

CROSS-REFERENCE TO RELATED APPLICATIONS

This patent application claims priority to European Patent Application No. 21206347.3, filed on Nov. 4, 2021, which is incorporated herein in its entirety by reference.

FIELD OF THE DISCLOSURE

The present disclosure relates to managing the operation of applications on mobile computing devices and, more particularly, managing the operation to adapt to a varying availability of network connectivity.

BACKGROUND OF THE INVENTION

Mobile computing devices with suitable applications may enable workers in an industrial plant to have important information at their fingertips everywhere throughout the plant. For example, manuals for a piece of equipment may be looked up right at the workplace where the work is to be performed. Also, live information from a distributed control system, DCS, of the plant may be made available. Information from the site where the work is to be performed may also be fed back and analyzed, facilitating repairs and maintenance of equipment. For example, U.S. Pat. No. 9,208,555 B1 discloses a method for inspecting electrical equipment by capturing images of the equipment using a mobile device and comparing these images to images of the nominal state of the respective equipment in a database.

Such connected applications rely on network connectivity. If the performance of the network unexpectedly drops to a low bandwidth or is lost altogether, the application may not function as expected. However, it is difficult to guarantee a high level of network connectivity in each and every location of the plant. Especially in an indoor environment on a factory floor, the probability is high that there will be "weak spots" in the connectivity. The required effort to eliminate all such "weak spots" is high.

BRIEF SUMMARY OF THE INVENTION

In one general aspect, the present disclosure is directed to a system and method that is configured to manage the operation of applications on mobile devices such that the impediment to their functionality that results from a drop in network performance may be minimized.

The present disclosure, therefore, provides a method for managing the operation of at least one application on a mobile computing device. The mobile computing device may, for example, be a smartphone, a tablet computer or a laptop. The mobile computing device is connected to at least one network that may, in particular, be a wireless network, such as a wireless LAN network, WLAN, or a public land mobile network, PLMN, such as a 4G or 5G network according to the respective 3GPP specification. The application is operable in a plurality of different operating modes. These operating modes may, in particular, be chosen such that the application demands different levels of network bandwidth, network latency, and/or responsiveness of an entity that it contacts via the network. That is, the selection of a particular operating mode may cause the application to demand a corresponding level, out of multiple different levels, of network bandwidth, network latency, and/or responsiveness of an entity that it contacts via the network.

In the course of the method, a current value, and/or a predicted future value, of the at least one performance indicator of the network is obtained. Based on a rule set, the value of the at least one performance indicator is mapped to at least one optimal operating mode of the application, and/or to at least one to-be-performed action for bringing supply of connectivity by the network and demand of connectivity by the application in line.

The application is caused to switch to the optimal operating mode, and/or the determined action is initiated. Alternatively or in combination, a user may be prompted to switch the application to the optimal operating mode, or to initiate the action.

In this manner, the available network performance is taken as a given, and the balance between functionality on the one hand and demand for network connectivity on the other hand is dynamically adjusted. In every situation with a given amount of available network performance, the highest possible amount of functionality is realized. How exactly the demand for network connectivity is adjusted is delegated to the concrete application.

BRIEF DESCRIPTION OF THE SEVERAL VIEWS OF THE DRAWING(S)

DETAILED DESCRIPTION OF THE INVENTION

Figure 1:
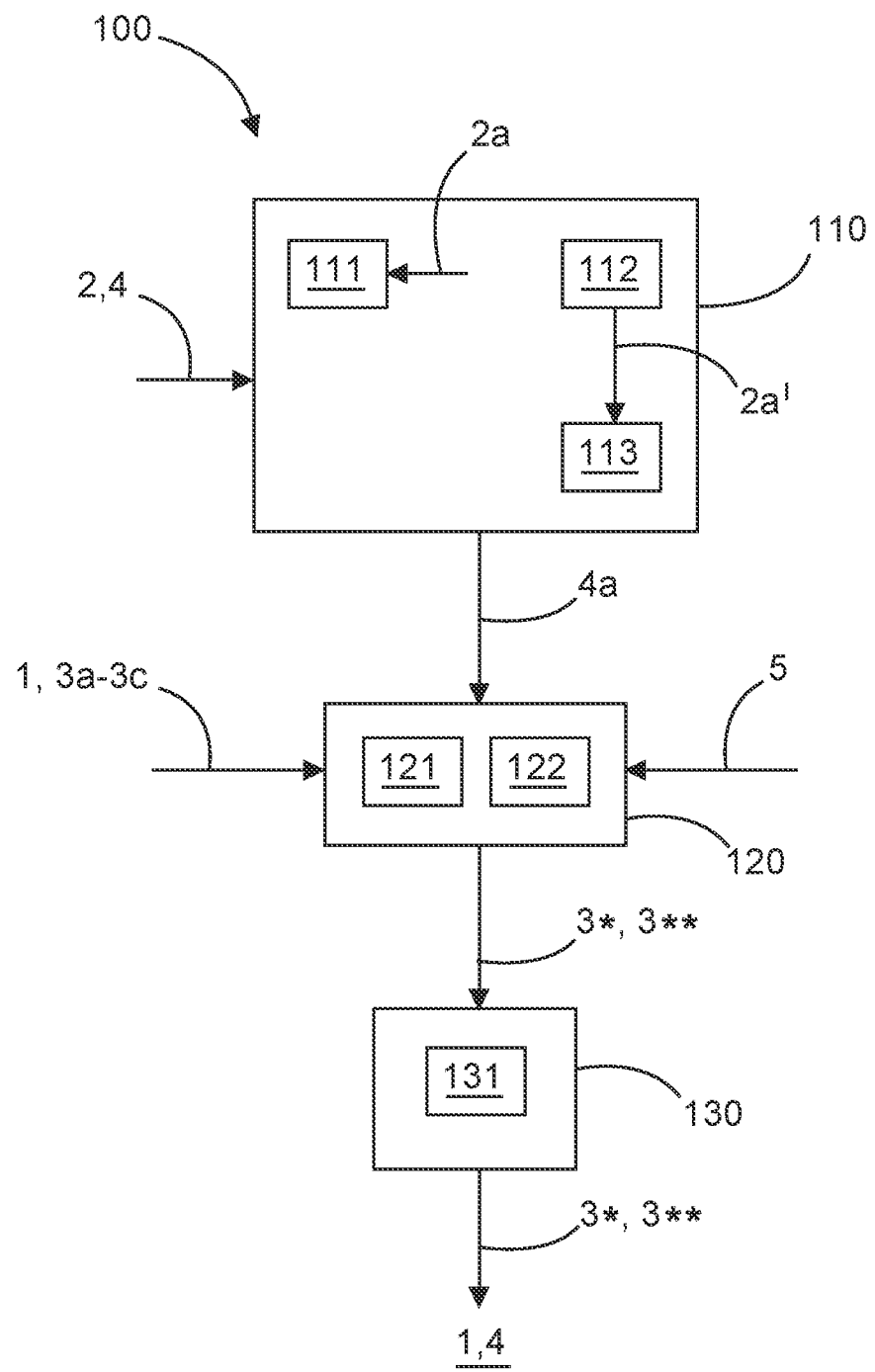
FIG. 1 is a flowchart for an exemplary embodiment of a method for managing operation of at least one application in accordance with the disclosure.

FIG. 1 is a schematic flow chart of an exemplary embodiment of the method 100 for managing the operation of at least one application 1 on a mobile computing device 2. The mobile computing device 2 is connected to at least one network 4. The application 1 is operable in a plurality of different operating modes 3a-3c.

In step 110, a current value, and/or a predicted future value, of at least one performance indicator 4a of the network 4 is obtained.

According to block 111, the performance indicator 4a may be looked up based at least in part on a location 2a of the mobile computing device 2.

According to block 112, a future location 2a' of the mobile computing device 1 may be predicted. Based on this predicted future location 2a', the future value of the performance indicator 4a may be obtained.

In step 120, the value of the at least one performance indicator 4a is mapped to at least one optimal operating mode 3* of the application 1, and/or to at least one action 3**, based on a rule set 5.

According to block 121, the action 3** may comprise a reconfiguration of the network 4, so as to improve the network connectivity of the application.

According to block 122, the action 3** may comprise causing the application 1 to pre-load, during a period of better network performance, data that it may need and not be able to load during a period of worse network performance.

In step 130, the application 1 is caused to switch to the optimal operating mode 3*, and/or the action 3** is initiated. This will affect the application 1, and/or the network 4.

Alternatively or in combination, a user may be prompted to switch the application 1 to the optimal operating mode 3\*, or to initiate the action **3\*\***.

According to block 131, the user of the mobile computing device 2 may be advised in advance before switching the application 1 to an operating mode 3a-3c where a lesser level of user experience is to be expected.

Figure 2:
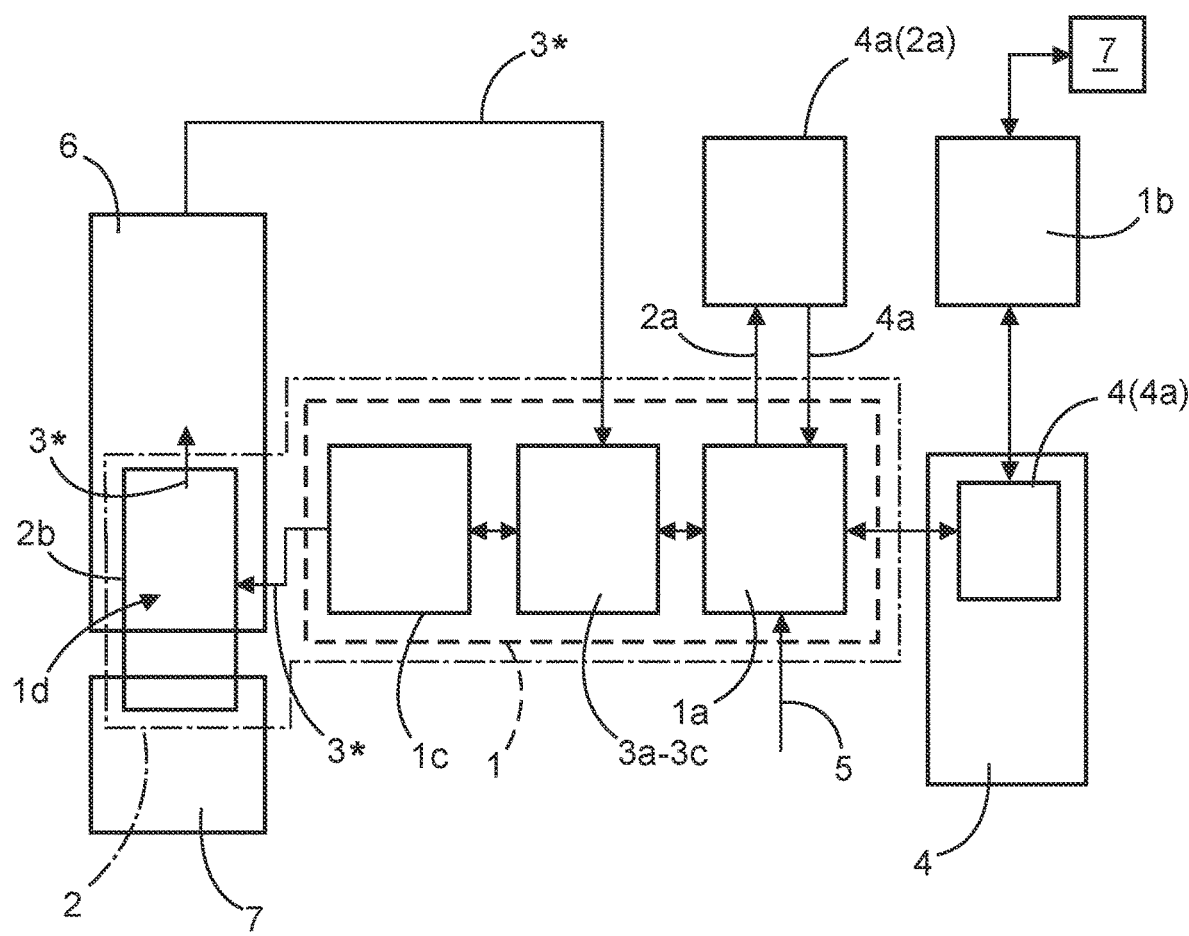
FIG. 2 is a block diagram for an exemplary setup of a system for performing the method in accordance with the disclosure.

FIG. 2 is a block diagram of an exemplary system or setup for performing the method 100. An application 1 runs on a mobile computing device 2. This application 1 is to interact with an industrial process 7 via a network 4. To this end, the application 1 comprises a network-aware front-end 1a that is able to communicate, via the network 4, with an application backend 1b that in turn is in communication with the process 7. This enables task support logic 1c to bi-directionally communicate with the application backend 1b.

The throughput of this communication depends on the performance of the network 4, which is characterized by at least one performance indicator 4a. The application 1 is configured to communicate with the application backend 1b in a manner that is more demanding or in a manner that is less demanding on the network 4, depending on the operating mode 3a-3c in which the application 1 is currently operating.

The network-aware front-end 1a queries, based on the location 2a of the mobile computing device 2, a database in which values of the performance indicator 4a are stored in association with locations 2a. That is, the database is given a location 2a, and it returns a value of the performance indicator 4a. Based on this performance indicator 3a, an optimal operating mode 3\* is determined. In the example shown in FIG. 2, this optimal operating mode is communicated to a user 6 via a user interface 1d on the screen 2b of the mobile computing device 2. The user 6 is then prompted to switch the application 1 to this optimal operating mode 3\*.

The user interface 1d also displays information about the process 7 to the user 6 and allows the user 6 to interact with the process 7. Thus, the user interface 1d is the connecting element between the user 6 and the process 7. This is different from the "low data mode" or "treat connection as metered" feature that is known from operating systems for smartphones and tablets (such as Apple iOS or Android), and also from desktop operating systems (such as Microsoft Windows). These features curb the data usage in response to the mobile computing device being connected to a network where such usage is budgeted and/or priced by time and/or volume, irrespective of the amount of performance that is actually available. This is intended for consumers who want to save costs on mobile data usage. But in the context of the present invention, the application on the mobile computing device is intended for work use, and what is to be optimized is the functionality of the application given an available amount of network performance. In particular, the method according to the present invention is intended to accommodate variations of available performance that occur, or are predicted to occur, while the mobile computing device remains connected to one and the same wireless network, such as a wireless LAN network deployed in the industrial plant, or a 5G network available on the plant. Examples for plants in which the invention may be used include chemical plants, ports, mines, ships and factories.

Also, the functioning of the application and of the network as a whole is made more reliable. If the application keeps trying highly demanding network activity that keeps failing because the currently available network performance is insufficient, this hogs system resources and causes unnecessary battery consumption on the mobile computing device. Also, the network connection may be flooded with futile traffic, causing other aspects of the application to fail as well. For example, if the application repeatedly attempts to pull a high-bandwidth video stream even though the network bandwidth is insufficient, this traffic may crowd out lower-bandwidth but important traffic, such as a data stream of measurement values.

In particular, the performance indicator may comprise an available throughput, a latency, and/or an available set of features. The available set of features may, for example, vary when the mobile device moves from an area where a mobile network provides 5G connectivity into an area where the same mobile network only provides 4G coverage.

The value of the performance indicator may, for example, be obtained by means of a measurement. For example, the mobile computing device may send a test data flow to an access point of the wireless network, receive this test data flow back from the access point and measure the throughput and/or latency. But a direct measurement of the performance indicator is not the only option. In a further advantageous embodiment, the obtaining of a current value, and/or of a predicted future value, of the at least one performance indicator comprises looking up the value of the performance indicator based at least in part on a location of the mobile computing device. For example, in an industrial plant, given a certain spatial distribution of wireless access points on the one hand, and buildings and equipment that absorb and reflect radio frequency waves on the other hand, there is basically a distribution of available network performance that may greatly vary spatially but is relatively invariant in time at any given point in space. Thus, once the spatial distribution has been surveyed, this distribution may be called upon later to find out the performance indicator based on the location of the mobile computing device.

Thus, in a further advantageous embodiment, the method further comprises monitoring the at least one performance indicator during motion of the mobile computing device, so as to survey the dependency of the at least one performance indicator on the location of the mobile computing device. For example, this monitoring may be performed during normal movement of the mobile computing device, e.g., within an industrial plant. But a path of movement of the mobile computing device may also be specifically devised as a "survey round" that, e.g., fits typical maintenance rounds or aims at simply covering all walkable or maintainable space.

Connectivity is not limited to one single network. Rather, multiple applications on the mobile computing device may be connected to different networks. For example, voice calls may be made via a public land mobile network, while larger amounts of data may be transferred via a local wireless LAN of an industrial plant operator. Also, in a 5G network, different applications may use different slices of the network, so as to assure that they do not compete with each other for the same scarce resource.

Also, the method is not limited to one single application. Rather, a management entity may manage requests from multiple apps for individual connections to the network for different purposes (such as voice, video, live data etc.) with different availability requirements. In this manner, it may be ensured that critical live data or voice receive high availability without spending network resources in bad coverage areas for video that might be secondary for the work to be performed with the mobile computing device.

In a further particularly advantageous embodiment, the obtaining of a predicted future value of the performance indicator comprises: obtaining a predicted future location of the mobile computing device; and obtaining the future value of the performance indicator based on the predicted future location.

A change of location is the primary reason for a varying availability of network performance. The location, on the other hand, can be predicted quite well in an industrial setting. Movement of workers with mobile devices is a lot less random than movement of consumers in public. Rather, much of the movement is explainable by fixed maintenance rounds through the industrial plant or scheduled work orders for particular pieces of equipment. Therefore, once it is discovered that a mobile computing device is moving on a certain path, the further movement along this path is quite predictable and may be used to predict changes in the available network performance. Outside the industrial plant, it may, for example, be detected if the mobile computing device is following a certain road or railroad. If the road or railroad is leading through a tunnel, the operation mode may be switched, and/or another action may be initiated, in time before the mobile computing device disappears in the tunnel and the network connection is lost.

Being able to predict such changes is very advantageous because this allows the user to prepare for them. For example, a user of the mobile computing device may be advised in advance before switching the application to an operating mode where a lesser level of user experience is to be expected. In this manner, the user may perform tasks for which a higher level of network performance is needed before this higher performance will disappear. The workflow of the user will not be disrupted. Also, a change of the network performance will not take the user by surprise, and will therefore not be perceived as a lack of reliability of the application. If the user is informed in advance that network connectivity will be poor in a particular area and certain features of the application will not be available, this will be accepted as a limitation of the system. The application will be perceived as reliable within such limitations; no application and no system is without limitations. But if features are unavailable unexpectedly, the application will be perceived as unreliable because it is failing without an apparent reason. The consequence may be that workers refrain from using the application and turn to makeshift solutions that they perceive to be more reliable. It is never good if workers in an industrial plant do something different than what is expected of them; work procedures and tools are there for a reason. For example, an application that workers are supposed to use daily may also serve to distribute important messages of the day to the workers, to make sure everybody reads them. But if worker refuses to use the application because it is "not reliable anyway," this worker will also miss the important messages.

Predicting the movement path and using this to predict network performance is also useful for introducing a switching hysteresis into the switching of operating modes. In this manner, a frequent switching of operating modes is avoided. Such frequent switching is perceived as annoying and may also cause loss of data, e.g., if a feature stops working while the user is entering data.

But the movement path is not the only quantity from which network performance may be predicted. For example, any other quantity or combination of quantities from the environment where the network is deployed may be supplied to a machine learning model that then outputs a prediction of the network performance. This is particularly useful in more complex situations where the network performance in any given location fluctuates over time. Given training values of the quantities and corresponding "ground truth" values regarding the network performance, the machine learning model may learn which influencing factors, alone or in combination, have an impact on the network performance. For example, the performance of a wireless LAN may be impaired by the operation of equipment that generates a lot of electromagnetic noise, such as microwave ovens or spark erosion machines.

In an exemplary embodiment, the application is chosen to comprise a displaying of live measurement data. A switch from a first operating mode to a second operating mode then causes the application to replace part of the live measurement data with interpolated values. For example, in the first operating mode, live updated graphs may scroll smoothly across the screen. In the second operating mode, a curve may be incrementally drawn with interpolated values on a static background. Compared with just reducing the update rate of the measurement data, this has the advantage of not causing the scrolling to stutter.

In a further exemplary embodiment, the application is chosen to comprise a displaying of a map view of data obtained from multiple devices in an industrial plant in a radius of interest around the mobile device. A switch from a first operating mode to a second operating mode then causes this radius to decrease. For example, in the first operating mode, the map may show data from all devices whose locations are within the area covered by the map. In the second operating mode, the map may show only data from devices whose locations are in the direct vicinity of the mobile computing device. In a third operating mode, the map may show only data from devices whose location is exactly where the user is tapping or clicking the display of the map.

In a further exemplary embodiment, the application is chosen to comprise a displaying of a live video stream. A switch from a first operating mode to a second operating mode then causes a compression level of the video stream to be adapted. In this manner, the video stream may be kept functioning so that even during a shortage of bandwidth, the most important aspects of the video stream can still be seen. In particular, the compression level may be adapted to the network bandwidth in a preemptive fashion, i.e., based on a prediction of the network bandwidth that may in turn be based on a prediction of the location of the mobile device. That is, the bandwidth requirement of the video stream may be decreased before the available network bandwidth actually goes down. This avoids interruptions of the stream and congestion of the network. In particular, unlike video streaming for consumer entertainment, live streaming for industrial purposes needs to be as close to real-time as possible. It is therefore not possible to pre-buffer content and to change the encoding of the video in a reactive manner in order to compensate a shortage of network bandwidth. These and other remedies add more latency to the video stream. Such latency is undesirable in an industrial application, in particular if any live actions on the plant are to be coordinated based on the live video stream. For example, if work is to be performed on electrical equipment, the states of switches that are visible in the video stream and power the equipment must be up-to-date. If the bandwidth or latency drops below a usable threshold, unlike consumer situations, the video quality is not simply becoming worse and worse, but video may be stopped altogether and in the next lower operating mode, live video is replaced by different method altogether. For example, in case of work performed on electrical equipment, if the state of switches is the essential information, this information might be extracted in real-time from the local video, leading to higher local power consumption on the mobile device, but being far more efficient to transmit over the network still in real-time. This switch would be announced to the user to let them prepare their own work approach beforehand.

In a further advantageous embodiment, the application is chosen to comprise a displaying of at least part of a human-machine interface of a distributed control system, DCS, of an industrial plant. For example, the level of detail of the information obtained by the application may then be tailored to the available network bandwidth using the different operating modes. In this manner, the amount of information that is presented may vary, but the user can be sure that the information that is actually presented is also up-to-date and accurate. For example, if a section of pipe is to be temporarily removed for maintenance work, the information whether this section of pipe is filled with hot medium, and/or whether this section of pipe is in a pressurized state, needs to be accurate at the time where the removing of this section is about to start. Such displaying of state information from the DCS may, for example, be combined with the displaying of step-by-step instructions to carry out the planned maintenance.

In a further advantageous embodiment, an action for bringing supply of connectivity by the network and demand of connectivity by the application in line comprises a reconfiguration of the network, so as to improve the network connectivity of the application. In particular, such reconfiguration may comprise diverting network resources from other network activities, and/or from other mobile devices, to the application, and/or to the mobile device with the application.

For example, if a critical repair task is to be performed, and an augmented reality overlay is needed for this work, then it may be worthwhile to temporarily divert network resources from other activities in order to allow the augmented reality overlay to go ahead despite bad network coverage. For example, if the network is a 5G network and the slice booked from a public land mobile network operator is already fully in use, another slice may be booked to let the critical repair task go ahead. It is also conceivable to temporarily reduce capacity for other mobile devices in the area, with prior announcement of the planned outage and an estimated time to recovery (in which case e.g. maintenance round planning for the affected users might be updated). Alternatively, resources might temporarily be taken from other non-mobile applications such as video, reducing on purpose the resolution or frame-rate in the vicinity. In a network with managed network devices, such as switches, routers and bridges, the configuration of these network devices may be adapted to give preference to the augmented reality overlay. The same applies more than ever for a software-defined network.

In a further advantageous embodiment, an action for bringing supply of connectivity by the network and demand of connectivity by the application in line comprises causing the application to pre-load, during a period of better network performance, data that it may need and not be able to load during a period of worse network performance. For example, large manuals or instruction videos that are needed for planned work on certain equipment may be pre-loaded, such that the work will not fail due to unavailability of the manual. Also, any other data, such as web pages or map data, that the mobile device is likely to access may be cached, so that it is available immediately if requested by the user. Available memory on mobile computing devices is typically under-utilized, so at a time where network bandwidth is abundant, it does not harm the normal activities on the mobile computing device to set aside some of this memory as cache.

The method may be wholly or partially computer-implemented. The invention therefore also relates to one or more computer programs with machine-readable instructions that, when executed on one or more computers and/or compute instances, cause the one or more computers to perform the method. In this context, a virtualization platform, a hardware controller, network infrastructure devices (such as switches, bridges, routers or wireless access points), as well as end devices in the network (such as sensors, actuators or other industrial field devices) that are able to execute machine readable instructions are to be regarded as computers as well.

The invention therefore also relates to a non-transitory storage medium, and/or to a download product, with the one or more computer programs. A download product is a product that may be sold in an online shop for immediate fulfillment by download. The invention also provides one or more computers and/or compute instances with the one or more computer programs, and/or with the one or more non-transitory machine-readable storage media and/or download products.

LIST OF REFERENCE SIGNS 1 application
1a network aware front-end of application 1
1b backend of application 1
1c task support logic in application 1
1d user interface of application 1
2 mobile computing device
2a location of mobile computing device 2
2a' predicted future location of mobile computing device 2
2b display of mobile computing device 2
3a-3c operating modes of application 1
3* optimal operating mode
3** action to match connectivity demand with network performance
4 network
4a performance indicator of network 4
5 rule set for determining optimal operating mode 3*, action 3**
6 user
7 industrial process
100 method for managing operation of application 1
110 obtaining current and/or predicted value of performance indicator 4a
111 looking up performance indicator 4a based on location 2a
112 obtaining predicted future location 2a'
113 predicting performance indicator 4a based on predicted location 2a'
120 determining optimal operating mode 3*, action 3**
121 reconfiguring network 4
122 causing pre-loading of data
130 causing switch to operating mode 3*, initiating of action 3**
131 advising user 6 before switching to optimal operating mode 3*

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for managing operation of at least one application on a mobile computing device, wherein the at least one application is operable in a plurality of different operating modes, the method comprising:
   obtaining a current value of at least one performance indicator of at least one network to which the mobile computing device is attached;
   mapping, based on a rule set, the current value of the at least one performance indicator to at least one optimal operating mode of the application and/or to an action; and
   causing the at least one application to:
     switch to the optimal operating mode,
     initiate the action, or
     prompt a user to switch the application to the optimal operating mode, or to initiate the action,
   wherein obtaining the current value includes obtaining a predicted future value of the at least one performance indicator by:
     obtaining a predicted future location of the mobile computing device; and
     obtaining the predicted future value of the at least one performance indicator based on the predicted future location.

2. The method of claim 1, wherein the at least one performance indicator comprises at least one of:
   an available throughput;
   a latency; and
   an available set of features.

3. The method of claim 1, wherein selection of an operating mode causes the application to demand a corresponding level, out of multiple different levels, of network bandwidth, network latency, and/or responsiveness of an entity that it contacts via the network.

4. The method of claim 1, further comprising monitoring the at least one performance indicator during motion of the mobile computing device so as to survey a dependency of the at least one performance indicator on a location of the mobile computing device.

5. The method of claim 1, wherein the obtaining the current value of the at least one performance indicator comprises looking up the current value of the at least one performance indicator based at least in part on a location of the mobile computing device.

6. The method of claim 1, wherein the at least one application comprises a displaying of live measurement data, and a switch from a first operating mode to a second operating mode causes the at least one application to replace part of the live measurement data with interpolated values.

7. The method of claim 1, wherein the at least one application comprises a displaying of a map view of data obtained from multiple devices in an industrial plant in a radius of interest around the mobile device, and a switch from a first operating mode to a second operating mode causes the radius of interest to decrease.

8. The method of claim 1, wherein the at least one application comprises a displaying of a live video stream, and a switch from a first operating mode to a second operating mode causes a compression level of the video stream to be adapted.

9. The method of claim 1, wherein the at least one application comprises a displaying of at least part of a human-machine interface of a distributed control system (DCS) of an industrial plant.

10. The method of claim 1, wherein the action comprises a reconfiguration of the network, so as to improve a network connectivity of the application.

11. The method of claim 10, wherein the reconfiguration of the network comprises: diverting network resources from other network activities or from other mobile devices to the application or to the mobile computing device.

12. The method of claim 1, further comprising: advising a user of the mobile computing device in advance before switching the application to an operating mode having a lesser level of user experience.

13. The method of claim 1, wherein the action comprises: causing the application to pre-load, during a period of better network performance, data that it may need and not be able to load during a period of worse network performance.

14. A non-transitory machine-readable storage medium and/or a download product containing a computer program comprising computer executable instructions, the computer executable instructions causing a computer to:
   manage operation of at least one application operating on the computer, wherein the at least one application is operable in a plurality of different operating modes;

obtain a current value of at least one performance indicator of at least one network to which the computer is attached;

map, based on a rule set, the current value of the at least one performance indicator to at least one optimal operating mode of the application and/or to an action; and cause the at least one application to:
   switch to the optimal operating mode,
   initiate the action, or
   prompt a user to switch the application to the optimal operating mode, or to initiate the action, wherein obtaining the current value includes obtaining a predicted future value of the at least one performance indicator by:
   obtaining a predicted future location of the mobile computing device; and
   obtaining the predicted future value of the at least one performance indicator based on the predicted future location.

15. A method for managing operation of at least one application on a mobile computing device, wherein the at least one application is operable in a plurality of different operating modes, the method comprising:
   obtaining a current value of at least one performance indicator of at least one network to which the mobile computing device is attached;
   mapping, based on a rule set, the current value of the at least one performance indicator to at least one optimal operating mode of the application and/or to an action; and
   causing the at least one application to:
      switch to the optimal operating mode,
      initiate the action, or
      prompt a user to switch the application to the optimal operating mode, or to initiate the action,
   wherein the at least one application comprises a displaying of live measurement data, and a switch from a first operating mode to a second operating mode causes the at least one application to replace part of the live measurement data with interpolated values.

16. A method for managing operation of at least one application on a mobile computing device, wherein the at least one application is operable in a plurality of different operating modes, the method comprising:
   obtaining a current value of at least one performance indicator of at least one network to which the mobile computing device is attached;
   mapping, based on a rule set, the current value of the at least one performance indicator to at least one optimal operating mode of the application and/or to an action; and
   causing the at least one application to:
      switch to the optimal operating mode,
      initiate the action, or
      prompt a user to switch the application to the optimal operating mode, or to initiate the action,
   wherein the at least one application comprises a displaying of a map view of data obtained from multiple devices in an industrial plant in a radius of interest around the mobile device, and a switch from a first operating mode to a second operating mode causes the radius of interest to decrease.

17. A method for managing operation of at least one application on a mobile computing device, wherein the at least one application is operable in a plurality of different operating modes, the method comprising:
   obtaining a current value of at least one performance indicator of at least one network to which the mobile computing device is attached;
   mapping, based on a rule set, the current value of the at least one performance indicator to at least one optimal operating mode of the application and/or to an action; and
   causing the at least one application to:
      switch to the optimal operating mode,
      initiate the action, or
      prompt a user to switch the application to the optimal operating mode, or to initiate the action,
   wherein the action comprises a reconfiguration of the network, so as to improve a network connectivity of the application,
   wherein the reconfiguration of the network comprises diverting network resources from other network activities or from other mobile devices to the application or to the mobile computing device.

* * * * *